Patented Oct. 8, 1935

2,016,306

UNITED STATES PATENT OFFICE 2,016,306

METHOD OF PREPARING AGGREGATES AND FILLERS

Vilas E. Watts, San Francisco, Calif., assignor to American Bitumuls Company, San Francisco, Calif., a corporation of Delaware No Drawing. Application August 7, 1931, Serial No. 555,865

3 Claims. (Cl. 106—31)

This invention relates to a method of preparing aggregates and fillers for use in bituminous compositions, pavements, etc., and is particularly directed to a process of coating discrete particles of aggregates and fillers with substantially uniform and closely adhering coatings or films of bituminous materials.

The invention is primarily directed toward a process of coating the exterior surfaces of particles of aggregates and fillers with bituminous coatings in a simple, rapid and efficacious manner, the resulting product consisting of discrete particles provided with such bituminous coatings.

By the terms "aggregates" and "fillers" reference is made to a variety of materials utilized as or performing the function of an aggregate or filler. Illustrative of such materials, reference may be had to gravel or crushed rock, crushed brick, slag, or other crushed mineral aggregate, sand, pumice, burned clay, etc., as well as to particles of coal, carbon or other carbonaceous material, and granular or fibrous material such as asbestos, mineral wool or slag wool, and similar material. Such aggregates or fillers may be employed for a variety of purposes. For example, the coated aggregate of this invention may be employed in the formation of pavements by compacting the aggregate, thereby utilizing the bituminous or asphaltic coating as a binder, or coated dust particles may be compacted together so as to form briquets. It is to be understood that uncoated fillers or aggregates may be mixed with coated fillers or aggregates produced by means of this method and such mixture utilized in forming the finished bodies or compositions.

Heretofore, attempts have been made to coat aggregates with bituminous emulsions and emulsions of the quick-breaking as well as the slow-breaking type were employed. Examples of quick-breaking bituminous or asphaltic emulsions are such as are prepared by the Braun process described in United States Patent No. 1,737,491 or by the Montgomerie process described in United States Patent No. 1,643,675, in which emulsions no emulsifiers other than alkaline water are added to the bituminous material during the emulsification. If, however, these quick-breaking emulsions are mixed with cold aggregates, the emulsions tend to break rapidly and form agglomerated masses without properly coating the aggregates.

Emulsions of the slow-breaking type may be produced by well known methods in which the bituminous material is emulsified with water by the aid of soaps, clays, and other emulsifiers. These emulsions are more or less stable as compared with emulsions of the quick-breaking type. The stability of quick-breaking emulsions may be increased by the addition of stabilizers, however.

Slow breaking emulsions may be mixed with cold, coarse aggregates and if a sufficient amount of emulsion is employed, substantially continuous surface coating of bituminous material may be produced on the particles. When the aggregate consists of fine particles or the mixture contains a considerable amount of filler, the mixing process is tedious, large quantities of bituminous emulsions need be employed, and the coating produced on the particles of aggregate is not always satisfactory or uniform. There is sometimes a complete breakdown of the emulsion during the process of mixing, causing the bituminous material to strip off of the particles of aggregate.

It is to be understood that these bituminous emulsions consist preferably of the type in which the bituminous material or composition is in the dispersed phase. Most of the aggregates and fillers are preferentially wetted with water rather than with oil or asphalt. The aggregates have an affinity for the water in the external phase of the emulsion and therefore draw onto their surfaces an amount of water from the emulsion, thus causing an initial breakdown of the emulsion adjacent the aggregate surfaces and imposing a water film between the aggregate and the bitumen of the emulsion.

If the emulsion is exceedingly stable so that breakdown is only produced by evaporation of the aqueous constituent and therefore such breakdown proceeds from the outer surface of the emulsion film inwardly to the aggregate, there is formed an outer film of bitumen which retards further evaporation and thus the aggregate offers a wetted surface to the bitumen which obviously prevents the bitumen from firmly and tenaciously adhering to the surface of the aggregate particle. The delay in adhesion caused by the presence of a wetted surface on the aggregates prevents immediate handling and manipulation of the material.

It is an object of this invention to disclose and provide a method of coating aggregates and fillers with bituminous emulsions whereby the bitumen or asphalt is immediately and firmly bonded to the surface of the aggregate or filler.

Another object of this invention is to disclose and provide a method of employing quick-breaking emulsions for the purpose of producing aggregates or fillers coated with bituminous or asphaltic material.

Another object is to disclose and provide a method of mixing bituminous emulsions with aggregates whereby a continuous, substantially uniform coating of bitumen may be applied to the external surfaces of aggregates and fillers with a minimum amount of emulsion.

Another object is to disclose and provide a method of coating aggregates and fillers with asphaltic and bituminous materials whereby the character and thickness of the coating may be readily controlled.

Another object of this invention is to disclose and provide a mixture of aggregate and bituminous emulsion for use as a cold material for road construction and maintenance.

An object of this invention is also to provide a coated aggregate or filler which may be stored for long periods of time without deterioration and which may be bound together to form a compact mass when desired, by merely subjecting the aggregate to compaction and compression.

A still further object of this invention is to disclose and provide a method of coating aggregates and fillers with a bituminous or asphaltic material not containing appreciable quantities of emulsifiers or other ingredients detrimental to the binding qualities of the bitumen or asphaltic coating.

These and other objects, uses and advantages of this invention will become apparent to those skilled in the art from the following detailed description and contemplation of the invention and typical examples thereof.

It has been found that the formation of a water or aqueous layer between a particle of the aggregate to be coated and the bituminous or asphaltic film may be prevented when the coating process is carried out in accordance with the method described hereinafter.

The permeation of the aggregate or filler particle with the aqueous phase of a bituminous or asphaltic emulsion can also be prevented, thereby causing the bitumen or asphalt to come into direct bonding contact with the surface of the aggregate or filler particle.

These results can be attained by heating the aggregate or filler material before contacting the same with the bituminous or asphaltic emulsion. It has been found that even though the aggregate or filler particle is composed of a material which is preferentially wetted with water, such preferential wetting characteristic may be destroyed by heating the particle to a temperature of over about 140° F. prior to its contact with the bituminous or asphaltic emulsion. Generally, temperatures of about 200° F. will be found satisfactory for ordinary aggregates such as sand, gravel, crushed rock, crushed brick, etc., although temperatures from about 150° F to about 250° F. are frequently employed. It is not usually desirable to heat the aggregate or filler to temperatures greater than 250° F. although higher temperatures are not necessarily detrimental and may even be necessary where unusually dry hard bituminous coatings are desired. In all instances, however, the aggregate particles are to be heated sufficiently to dry the particles and prevent the formation or presence of water on the particles, thus permitting an intimate subsequent contact of the surfaces with the bituminous constituent of the emulsion without the presence of a film of water between the particles and the bitumen.

The bituminous or asphaltic material is preferably in the form of an aqueous emulsion with the bituminous material in the dispersed phase. Either quick-breaking or slow-breaking emulsions may be employed. Aggregate temperatures of around 200° F. are satisfactory for quick-breaking emulsions although higher temperatures not detrimental to the asphalt or bitumen used may be employed. Aggregate temperatures below 180° F. give satisfactory results with slow-breaking emulsions.

When quick-breaking emulsions are mixed with mineral particles at atmospheric temperatures, the asphalt constituting the dispersed phase in such an emulsion coalesces quickly and forms a more or less continuous film of asphalt surrounding the particles of aggregate or filler. The aqueous liquid from the continuous phase of the emulsion coats both surfaces of the asphalt film so formed and by reason of the tendency of the aggregate toward preferential wetting prevents immediate adhesion of the asphalt to the aggregate or filler particle. Continuance of the mixing operation which is necessary to secure uniform coating, therefore, results in stripping the asphalt film from the wetted aggregate and the agglomeration of the asphalt in lumps and clots, defeating the purpose of the mixing operation.

By previously heating the aggregate to temperatures of 180° F. to 250° F. so as to present a dry surface on the particles of aggregate the formation of a non-sticky aqueous coating on aggregate beneath the film of asphalt is prevented. The coalescence of the asphalt is expedited and instant adhesion of the bituminous binder to the particle of aggregate or filler is secured. The tenacious adherence of the bituminous binder to the aggregate can not be obtained unless the surfaces of the aggregate have been heated under such conditions as to eliminate the water therefrom.

In the process of demulsification in which the emulsion is brought into contact with the dry heated stone, small amounts of moisture remain in intimate admixture with the bituminous material, resulting in softness and stickiness or tackiness not found in the asphalt in its original condition previous to emulsification, nor subsequent to the complete removal of moisture added during emulsification. The amount of moisture so remaining is found to vary with the temperature of the aggregate or filler at the time mixing is begun. Soft asphalt and a high degree of tackiness are desirable under certain conditions of use, as for example where mixtures are to be stored prior to use. Harder and less tacky coatings are sometimes required.

By regulating the temperature of the aggregate, the character of the coating produced on the particles may be controlled. By employing higher aggregate temperatures, a harder and less sticky coating is produced on the particles of the aggregate or filler. When low temperatures are employed, the evaporation of water from the emulsion is slow and slow-breaking emulsions are preferably employed when aggregate temperatures below about 180° F. are used.

Coated aggregate suitable for use in road construction and maintenance may be prepared as follows:

A quantity of crushed rock of a suitable size and grading such as, for example, ranging from 10 mesh to ¼ inch, is dry heated in a revolving cylindrical dryer to prevent the existence of a film of moisture on the surfaces of the aggregate, as to a uniform temperature of about 200° F. In such cylinder dryers the material is subjected to the effect of an axially directed flame which contacts with the material tumbling through the rotating cylinder. The rock should be subjected to dry heat which may be supplied in any form other than direct contact of the rock with steam, so as to prevent the presence of water on the surfaces of the rock. The dry heated aggregate may then be placed in a drum or pug mixer and cold bituminous emulsion (containing about 55% asphalt in this instance) may be added in the proportion of about ½ gallon of emulsion per cubic foot of heated aggregate. The mixture of aggregate and emulsion is then agitated in the customary manner until all particles of the aggregate are properly coated, whereupon the material may be discharged into storage or used immediately as the case may be.

As previously pointed out, this procedure breaks the emulsion adjacent the particles of aggregate and repels the water film which would ordinarily form on the surfaces of the rock particles. As the water is repelled by the rock surfaces, the demulsified asphalt in somewhat heated condition is allowed to come into intimate contact with the rock particles, thereby forming a continuous, closely adhering coating of asphalt on such particles.

In the example given hereinabove, the temperature of the aggregate was insufficient to evaporate all of the water present in the emulsion, the temperature being merely adequate to remove or repel any water from intimate wetting contact with the rock particles. The resulting product is found to consists of separate and discrete particles of aggregate, each particle being covered with a continuous film of asphalt of somewhat sticky consistency but capable of being loosely piled in storage for extended periods of time without objectionable caking or the formation of closely bonded masses in which the individual particles are indistinguishable.

While the coated product may be readily handled and transported, the separate particles become bound together by the asphaltic film and a solid homogeneous pavement is produced when such product is spread and rolled or otherwise compacted.

Although asphaltic emulsions have been mentioned hereinabove, it is to be understood that any bituminous emulsion such as a tar emulsion, or emulsion of any adhesive binder may be employed in the process of this invention.

Furthermore, it is to be understood that the process is not restricted to its use in the coating of fine or coarse rock or sand particles as it is equally applicable to the treatment of fibrous materials such as mineral wool, asbestos, etc., hereinbefore referred to as fillers. Such fillers, coated with bituminous materials, are adapted to numerous uses as, for example, in the manufacture of battery boxes, floorings, shingles, etc.

The invention may also be applied to the treatment of coal dust or coal particles and other granular or fibrous materials in many well known industrial activities.

All such changes and modifications as come within the scope of the appended claims are embraced thereby.

I claim:

1. A process of coating particles of aggregates with tenaciously adherent films of bituminous material, which consists in the steps of heating an aggregate by means of dry heat to a temperature of about 250° F. whereby moisture is expelled therefrom and the formation of water films on the surfaces of such aggregate particles is prevented, and then mixing the dry aggregate while in a heated state with an aqueous bituminous emulsion.

2. A method of depositing bituminous films on surfaces of mineral aggregate particles which consists of the steps of heating a mineral aggregate by means of dry heat to about 250° F. to expel moisture therefrom and prevent water films from forming on such mineral aggregate particles, and then mixing the dry aggregate particles while in a heated state with a quick-breaking bituminous emulsion having an aqueous external phase.

3. A process of producing a mixture of aggregates and bitumens in which the hardness and stickiness of the bituminous coating on the particles of aggregates is controlled, which comprises heating the particles to about 250° F. by subjecting them to the action of dry heat whereby the formation of wetted surfaces on the particles is prevented, and then mixing the dry particles while in a heated state with an aqueous emulsion containing bitumens in the dispersed phase whereby the water in said emulsion is caused to evaporate and the bitumen is brought into tenacious adherence with the surface of the particles.

VILAS E. WATTS.